Dec. 12, 1961 T. S. KULKA 3,012,662

RETAINING MEANS FOR TAPE WOUND ON A REEL

Filed May 4, 1959 2 Sheets-Sheet 1

INVENTOR

THOMAS S. KULKA

BY Almon S. Nelson

ATTORNEY

Dec. 12, 1961 T. S. KULKA 3,012,662

RETAINING MEANS FOR TAPE WOUND ON A REEL

Filed May 4, 1959 2 Sheets-Sheet 2

INVENTOR
THOMAS S. KULKA

BY Elmon S. Nelson
ATTORNEY

United States Patent Office 3,012,662

Patented Dec. 12, 1961

3,012,662

RETAINING MEANS FOR TAPE WOUND ON A REEL

Thomas S. Kulka, 200 Film Bldg., 2108 Payne Ave., Cleveland 14, Ohio

Filed May 4, 1959, Ser. No. 810,718
9 Claims. (Cl. 206—53)

This invention relates to the storage and handling of materials and more particularly to devices for retaining tape in place on a reel and preventing inadvertent unwinding thereof.

The use of tape coated with a suitable magnetic material is now widely used for the recording of sound or video program material, and since this tape is relatively thin and fragile, care must be taken in the use and storage of the same in order to prevent damage thereto. Different widths of tape may be utilized for different purposes, and such tape is commonly stored on reels, either before or after recording and in lengths from six hundred feet to several thousand feet. Accordingly, it is important to adequately protect such tape and prevent inadvertent unwinding thereof from the reel on which the same is wound, since as a result of such unwinding, the tape may become easily damaged and heretofore several different methods have been utilized for retaining the tape on the reel and preventing unwinding thereof.

Previously utilized methods for preventing unwinding of tape stored on a reel have included merely enclosing the reel in a suitable box or other container and while this, in some cases, adequately serves the purpose so long as the reel remains in the box upon removal therefrom the tape frequently becomes unwound and may become tangled and damaged. An elastic or rubber band has heretofore been applied around the tape on the reel to prevent unwinding of the same, and while this may adequately serve the purpose in some cases, nevertheless, difficulty has been experienced due to the tendency of the elastic band to slip between the tape and the flanges of the reel, thereby destroying any holding function. Furthermore, it has proven somewhat difficult to hold the reel with the tape wound thereon and apply the elastic band thereto without damage to the tape. Metal clips have also been proposed and utilized, but these are somewhat difficult to use and may easily result in damage to the tape. Also the use of boxes or containers, as well as devices in the nature of metallic clips have proved relatively costly and in addition fail to fulfill the purpose for which they are intended.

It is accordingly an object of the invention to provide a retaining means for tape wound on a reel, which means may be conveniently and economically constructed from readily available and inexpensive materials and which may be conveniently applied to the tape wound on a reel to prevent inadvertent unwinding thereof.

A further object of the invention is the provision of a retaining means for tape wound on a reel, such means including an elastic strap for engaging the tape and including means for preventing displacement of the strap into the space between the tape and the flanges of the reel.

A still further object of the invention is the provision of a retaining means for tape wound on a reel, such means being largely constructed from elastic material, such as rubber, and including means for locating the same on a reel and for preventing inadvertent removal thereof, thereby retaining the tape in position on a reel.

Another object of the invention is the provision of a retaining means for tape wound on a reel in which the means engaging the tape is formed of soft yieldable material thereby precluding damage to the tape.

A further object of the invention is the provision of a retaining means for tape wound on a reel in which means is provided for accommodating the retaining means to reels having different spacing between the flanges for accommodating tape of different widths.

A still further object of the invention is the provision of retaining means for tape wound on a reel, such means including merely an elastic band, together with means on the band for yieldably engaging the tape to retain the same on the reel.

Another object of the invention is the provision of retaining means for tape wound on a reel, which means may be employed without modification of the reel and which will serve to adequately retain the tape in place thereon without damage to either the reel or the tape.

Further objects and advantages of the invention will be apparent from the following description taken in conjunction with the accompanying drawing wherein.

Figure 1:
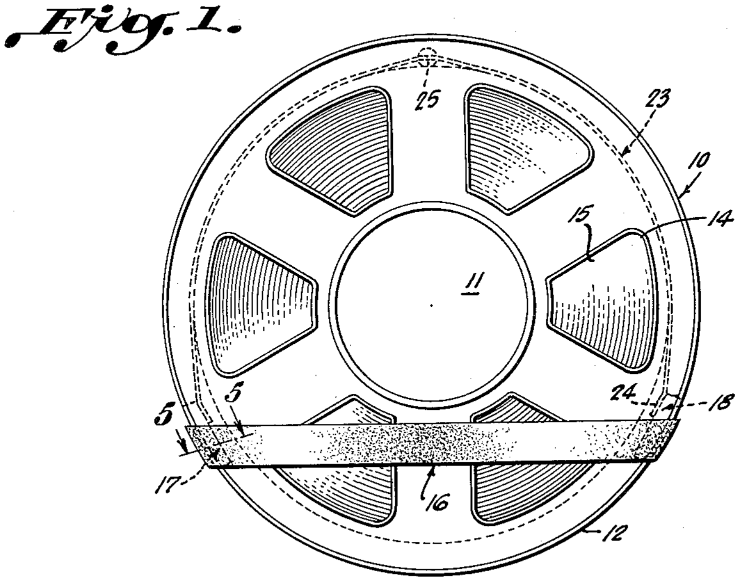
FIG. 1 is a front elevational view of a reel with tape wound thereon and with a retaining means constructed in accordance with one form of this invention applied thereto.
Figure 2:
FIG. 2 is a top elevational view of the reel and retaining means shown in FIG. 1.

With the continued reference to the drawing and particularly FIGS. 1 to 5, there is shown one form of retaining means constructed in accordance with this invention and which may be utilized on a reel 10 formed of plastic or other suitable material, the reel 10 being provided with a hub 11 and spaced side flanges 12 and 13. The flanges 12 and 13 may, if desired, be provided with a plurality of apertures 14 of any desired shape to reduce the weight of the reel and also permit visual inspection of the tape 15 wound thereon. The tape 15 may be entirely conventional and is commonly formed of plastic or other suitable material coated with magnetic material on one side thereof, and such tape may be supplied in different widths and lengths and is widely utilized for recording sound or video program material on suitable recording apparatus and may also be utilized for play back of the material on the same or other apparatus. It is also to be noted that the tape 15 is wound on the reel 10 is such a manner as to provide an outer diameter less than the diameter of the flanges 12 and 13.

The retaining means shown in FIGS. 1 to 5 may well comprise an elongated elastic band 16 formed of rubber or other suitable elastic material and the band 16 is of less length than the diameter of the flanges 12 and 13. The band 16 is relatively wide and provides sufficient tension to firmly embrace the flanges 12 and 13 of the reel 10 as clearly shown in FIG. 1. Generally rectangular blocks 17 and 18 are secured to the inner surface of the band 16 at each end, and as clearly shown in FIG. 4, one end 19 of the blocks 17 and 18 is substantially flush with the adjacent edge 20 of the band 16 and the opposite ends 21 of the blocks 17 and 18 project outwardly of the opposite edge 22 of the band 16. The blocks 17 and 18 are of a width substantially equal to the spacing between the flanges 12 and 13 of the reel 10 and the blocks 17 and 18 may be formed of a yieldable or a rigid material as desired.

Figures 3, 4, 5:
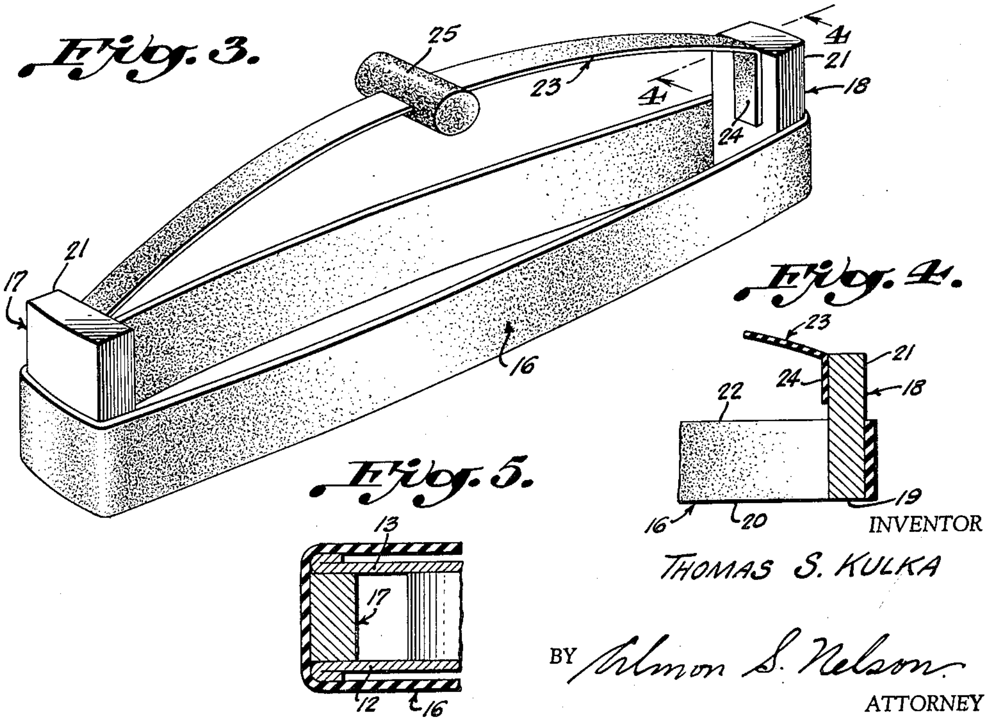
FIG. 3 is a view in perspective showing the retaining means of FIG. 1 prior to applying the same to tape wound on a reel.
FIG. 4 is a fragmentary sectional view taken substantially on the line 4—4 of FIG. 3 and showing a detail of construction of the retaining means of this invention.
FIG. 5 is a fragmentary sectional view taken substantially on the line 5—5 of FIG. 1 and showing the relationship between the retaining means of this invention and the flanges of the reel.

An elastic tape engaging strap 23 of substantially the same length as the band 16 is secured to the inner surface of the projecting end 21 of each block 17 and 18 as shown at 24 in FIGS. 3 and 4. The strap 23 is of less width and thinner than the band 16 thereby providing less tension than the band 16. Substantially midway of the length of the strap 23 there is secured a tape engaging member 25 of yieldable material, such as sponge rubber or other suitable material, and the member 25 projects laterally at each side of the strap 23 and is of a length substantially equal to the space between the flanges 12 and 13 of the reel 10.

In utilizing the tape retaining means shown in FIGS. 1 to 5, it is assumed that tape 15 is wound on the reel 10 as shown in FIG. 1 and the retaining means is applied to the reel 10 with the band 16 embracing the flanges 12 and 13 to one side of the center of the hub 11 and with the strap 23 disposed between the flanges 12 and 13 and in engagement with the peripheral surface of the tape 15 and also with the member 25 engaging the tape 15 to hold the same in place and also to prevent displacement of the strap 23 into the space between the flanges 12 and 13 and the tape 15. As clearly shown in FIGS. 1 and 5, the blocks 17 and 21 are received between the flanges 12 and 13 with the outer edges of the flanges 12 and 13 being disposed between the side of the block 17 and 18 and the adjacent inner surfaces of the band 16. As clearly shown in FIG. 1, the tension of the band 16 operates to retain the device on the reel 10 and also to retain the strap 23 and member 25 in engagement with the peripheral surface of the tape 15 to prevent unwinding thereof and retain the same on the reel 10.

Figures 6, 8, 9:
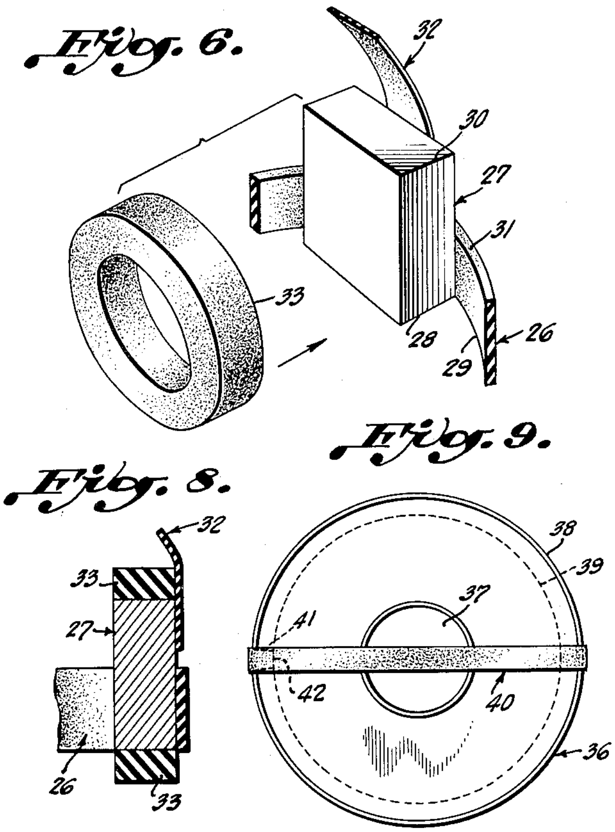
FIG. 6 is a fragmentary exploded view in perspective showing a modified form of the retaining means shown in FIG. 3.
FIG. 8 is a fragmentary sectional view taken substantially on the line 8—8 of FIG. 7 and showing details of construction of the form of the invention shown in FIG. 6.
FIG. 9 is a front elevational view of a reel together with a further modified form of tape retaining means applied thereto.
Figure 7:
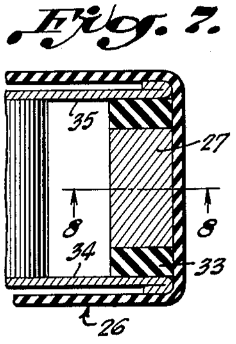
FIG. 7 is a fragmentary sectional view similar to FIG. 5, but showing the relationship between the modified form of the invention of FIG. 6 and the flanges of the reel.

In the form of the invention shown in FIGS. 6 to 8, there is provided an elongated elastic band 26 similar to the band 16 described above, and a substantially square block 27 is secured to the inner surface of the band 26 at each end thereof. As in the form of the invention described above, one edge 28 of the block 27 is substantially flush with the adjacent edge 29 of the band 26 and the opposite edge 30 of the block 27 projects outwardly at the opposite edge 31 of the band 26. An elastic tape engaging strap 32, similar to the strap 23 described above, is secured to the outer surface of each block 27, as clearly shown in FIGS. 6 and 8. As in the form of the invention shown in FIGS. 1 to 5, the strap 32 is of substantially the same length as the band 26, but is of less width and is thinner than the band 26 in order to provide less tension. Also, if desired, a tape engaging member similar to the member 25 shown in the first form of the invention may be secured to the strap 32 substantially midway of the length thereof or at any other desired location and will operate in the same manner as the tape engaging member 25 shown in FIGS. 1 to 5.

The retaining means shown in FIGS. 6 to 8 is utilized in the same manner as the retaining means shown in FIGS. 1 to 5 and may be applied to a reel in which the spacing between the flanges is substantially equal to the width of the blocks 27. However, in the event the spacing between the flanges of the reel is greater than the width of the blocks 27, there may be provided a collar 33 of elastic material and the collar 33 applied to the blocks 27, as clearly shown in FIGS. 7 and 8, to increase the size of the blocks 27, thereby accommodating the device to reels in which the spacing between the flanges is greater than the width of the blocks 27. Obviously, collar 33 of different thicknesses may be provided in order to accommodate many different spacings between the flanges of the reels on which the device is to be utilized. The retaining means of FIGS. 6 to 8 operates to hold the tape on the reel in exactly the same manner as described above in connection with the form of the invention shown in FIGS. 1 to 5. As shown in FIG. 7, reel flanges 34 and 35 engage the outer periphery of the collar 33 applied to the block 27.

Figures 10, 11, 13, 14:
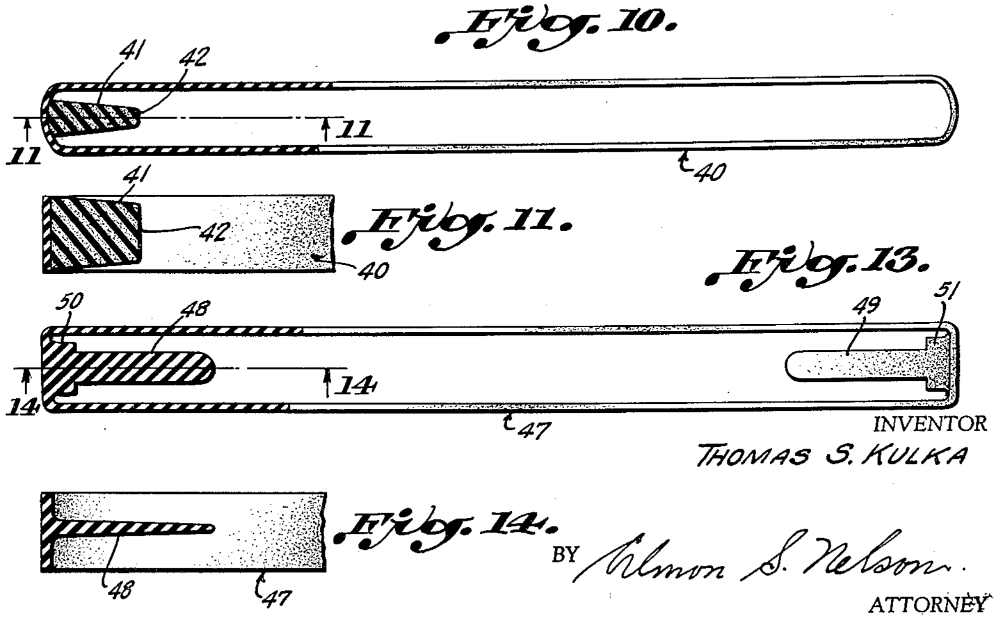
FIG. 10 is an elevational view with parts in section for greater clarity and showing the tape retaining means of the modified type shown in FIG. 9.
FIG. 11 is a fragmentary sectional view taken substantially on the line 11—11 of FIG. 10.
FIG. 13 is an elevational view with parts in section for greater clarity and showing the further modified form of retaining means shown in FIG. 12.
FIG. 14 is a fragmentary sectional view taken substantially on the line 14—14 of FIG. 13.

With particular reference to FIGS. 9 to 11 there is shown a still further form of retaining means for tape wound on a reel and in which the reel 36 having a hub 37 and side flanges 38 is provided with tape 39 wound thereon to a diameter less than the diamter of the flanges 38 and in which the retaining means may well comprise an elongated elastic band 40 normally of less length than the diameter of the flanges 38 of the reel 36, the band 40 being of sufficient width and thickness and being formed of suitable material to provide the desired tension to retain the same on the reel 36 embracing the flanges 38 as clearly shown in FIG. 9.

As clearly shown in FIGS. 10 and 11, a tapered block 41 of yieldable material is secured to the inner surface of the band 40 at one end, and the width of the block to the base attached to the band 40, is substantially equal to the width of the band 40 and the thickness of the block 41 at the base is substantially equal to the space between the flanges 38 of the reel 36.

In utilizing the retaining means shown in FIGS. 9 to 11, it is merely necessary to place the band 40 over the flanges of the reel 36 substantially along a diameter and with the block 41 disposed between the flanges 38 with the inner end 42 of the block 41 engaging the peripheral surface of the tape 39 on the reel 36 to prevent unwinding thereof and retain the same on the reel.

Figure 12:
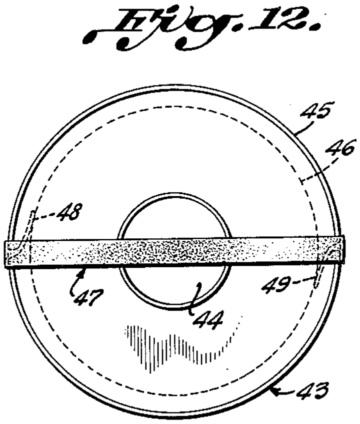
FIG. 12 is a front elevational view of a reel and showing a still further modified form of tape retaining means applied thereto.

The form of the invention shown in FIGS. 12 to 14 is somewhat similar to the form shown in FIGS. 9 to 11, and as shown in FIG. 12 is utilized on a reel 43 having a hub 44 and spaced side flanges 45. Tape 46 is wound on the reel 43 to a diameter less than the diameter of the flanges 45.

The retaining means of FIGS. 12 to 14 may well comprise an elongated elastic band 47 of less length than the diameter of the flanges 45 of the reel 43, and secured to the inner surface of the band 47 at each end are elongated flexible fingers 48 and 49. The width of the base 50 of the finger 48, as well as the width of the base 51 of the finger 49, is substantially equal to the space between the flanges 45 of the reel 43 and the thickness of each finger 48 and 49 is substantially less than the width, and as shown in FIG. 14, the fingers 48 and 49 may be tapered to provide the desired flexibility.

In use, the retaining means shown in FIGS. 12 to 14 is applied to the reel 43 with the band 47 embracing the flanges 45 substantially along a diameter and with the fingers 48 and 49 flexing in opposite directions as clearly shown in FIG. 12 and engaging the peripheral surface of the tape 46 in order to prevent unwinding and retain the same on the reel 43. With this form of the invention the flexibility of the fingers 48 and 49 will permit some variation in the diameter of the tape 46 wound on the reel 43 while still retaining the same in place thereon.

While the tape retaining means of this invention have been described primarily for use in connection with magnetic tapes, it is to be understood that this is for illustrative purposes only, and that such retaining means may be utilized with other forms of tapes, such as motion picture film or the like, and indeed may be utilized for retaining tape on a reel wherever desired. It will be obvious that the above described forms of the invention provide tape retaining means which may be economically constructed from inexpensive materials and which will operate to adequately retain tape on a reel in the manner and for the purpose intended.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A retaining means for tape wound on a reel, said reel having a hub and spaced side flanges and with the tape wound on said hub between said flanges having a diameter less than the diameter of said flanges, said retaining means comprising an elongated elastic band of less length than twice the diameter of said flanges plus twice the distance between said flanges, a generally rectangular block of yieldable material secured to the inner surface of said band at each end, the width of said blocks being substantially equal to the space between said flanges, the length of said blocks being greater than the width of said band, one end of said blocks being substantially flush with the adjacent edges of said band and the opposite ends projecting outwardly of said band at the opposite edges, an elastic tape engaging strap of substantially the same length as said band, said strap being secured at each end to the inner surfaces of said blocks, said strap being of less width and thinner than said band and a tape engaging member of yieldable material secured to said strap substantially midway of the length thereof, said member projecting laterally of said strap at opposite sides and being of a length substantially equal to the space between said flanges, whereby said band may be received around said flanges to one side of the center of said hub and with said blocks, strap and member disposed between said flanges and with said strap and member engaging said tape to prevent unwinding and to retain the same on said reel.

2. A retaining means for tape wound on a reel, said reel having a hub and spaced side flanges and with the tape wound on said hub between said flanges having a diameter less than the diameter of said flanges, said retaining means comprising an elongated elastic band of less length than twice the diameter of said flanges plus twice the distance between said flanges, a generally rectangular block secured to the inner surface of said band at each end, the width of said block being substantially equal to the space between said flanges, the length of said blocks being greater than the width of said band, one end of said blocks being substantially flush with the adjacent edges of said band and the opposite end projecting outwardly of said band at the opposite edges, an elastic tape engaging strap of substantially the same length as said band, said strap being secured at each end to the inner surfaces of said blocks, said strap being of less width and thinner than said band and a tape engaging member of yieldable material secured to said strap substantially midway of the length thereof, said member projecting laterally of said strap at opposite sides and being of a length substantially equal to the space between said flanges, whereby said band may be received around said flanges to one side of the center of said hub with said blocks, strap and member disposed between said flanges and with said strap and member engaging said tape to prevent unwinding and to retain the same on said reel.

3. A retaining means for tape wound on a reel, said reel having a hub and spaced side flanges and with the tape wound on said hub between said flanges having a diameter less than the diameter of said flanges, said retaining means comprising an elongated elastic band of less length than the diameter of said flanges, a generally rectangular block geared to the inner surface of said band at each end, the width of said blocks being substantially equal to the space between said flanges, the length of said blocks being greater than the width of said band, one end of said blocks being substantially flush with the adjacent edges of said band and the opposite ends projecting outwardly of said band at the opposite edges, an elastic tape engaging strap of substantially the same length as said band, said strap being secured at each end to said block, said strap being of less width and thinner than said band and a tape engaging member of yieldable material secured to said strap substantially midway of the length thereof, said member projecting laterally of said strap at opposite sides and being of a length substantially equal to the space between said flanges, whereby said band may be received around said flanges to one side of the center of said hub with said blocks, strap and member disposed between said flanges and with said strap and member engaging said tape to prevent unwinding and to retain the same on said reel.

4. A retaining means for tape wound on a reel, said reel having a hub and spaced side flanges and with the tape wound on said hub between said flanges having a diameter less than the diameter of said flanges, said retaining means comprising an elongated elastic band of less length than the diameter of said flanges, a generally rectangular block secured to the inner surface of said band at each end, the length of said blocks being greater than the width of said band, one end of said blocks being substantially flush with the adjacent edges of said band and the opposite ends projecting outwardly of said band at the opposite edges, an elastic tape engaging strap of substantially the same length as said band, said strap being secured at each end to said blocks, said strap being of less width and thinner than said band and a tape engaging member of yieldable material secured to said strap substantially midway of the length thereof, said member projecting laterally of said strap at opposite sides and being of a length substantially equal to the space between said flanges, whereby said band may be received around said flanges to one side of the center of said hub with said blocks, strap and member disposed between said flanges and with said strap and member engaging said tape to prevent unwinding and to retain the same on said reel.

5. A retaining means for tape wound on a reel, said reel having a hub and spaced side flanges and with the tape wound on said hub between said flanges having a diameter less than the diameter of said flanges, said retaining means comprising an elongated elastic band of less length than the diameter of said flanges, a generally rectangular block secured to the inner surface of said band at each end, the length of said blocks being greater than the width of said band, one end of said blocks being substantially flush with the adjacent edges of said band and the opposite ends projecting outwardly of said band at the opposite edges, an elastic tape engaging strap secured at each end to said blocks, said strap being of less width and thinner than said band and a tape engaging member of yieldable material secured to said strap midway of the length thereof, said member projecting laterally of said strap at opposite sides and being of a length substantially equal to the space between said flanges, whereby said band may be received around said flanges to one side of the center of said hub with said blocks, strap and member disposed between said flanges and with said strap and member engaging said tape to prevent unwinding and to retain the same on said reel.

6. A retaining means for tape wound on a reel, said reel having a hub and spaced side flanges and with the tape wound on said hub between said flanges having a diameter less than the diameter of said flanges, said retaining means comprising an elongated elastic band of less length than the diameter of said flanges, a generally rectangular block secured to the inner surface of said band at each end, the length of said blocks being greater than the width of said band, one end of said blocks being substantially flush with the adjacent edges of said band and the opposite ends projecting outwardly of said band at the opposite edges and an elastic tape engaging strap secured at each end to said blocks, said strap being of less width and thinner than said band, whereby said band may be received around said flanges to one side of the center of said hub with said blocks and strap disposed between said flanges and with said strap engaging said tape to prevent unwinding and to retain the same on said reel.

7. A retaining means for tape wound on a reel, said reel having a hub and spaced side flanges and with the tape wound on said hub between said flanges having a diameter less than the diameter of said flanges, said retaining means comprising an elongated elastic, reel flange embracing band of less length than the diameter of said flanges, said band having two major portions that extend substantially parallel to each other when applied to said reel, a generally rectangular block secured to the inner surface of said band at each end and an elastic tape engaging strap secured at each end to said blocks, said strap being of less width and thinner than said band and extending at right angles to said parallel portions when applied to said reel, whereby said band may be received around said flanges to one side of the center of said hub with said blocks and strap disposed between the flanges and with said strap engaging said tape to prevent unwinding and to retain the same on said reel.

8. A retaining means for tape wound on a reel, said reel having a hub and spaced side flanges and with the tape wound on said hub between said flanges having a diameter less than the diameter of said flanges, said retaining means comprising an elongated elastic, reel flange embracing band of less length than the diameter of said flanges, said band having two major portions that extend substantially parallel to each other when applied to said reel, a generally rectangular block secured to the inner surface of said band at each end and an elastic tape engaging strap secured at each end to said blocks and extending at right angles to said parallel portions when applied to said reel, whereby said band may be received around said flanges to one side of the center of said hub with said blocks and strap disposed between the flanges and with said strap engaging said tape to prevent unwinding and to retain the same on said reel.

9. A retaining means for tape wound on a reel, said reel having a hub and spaced side flanges and with the tape wound on said hub between said flanges having a diameter less than the diameter of said flanges, said retaining means comprising an elongated elastic, reel flange embracing band of less length than the diameter of said flanges, said band having two major portions that extend substantially parallel to each other when applied to said reel, and an elastic tape engaging strap secured at each end to said band and extending at right angles to said parallel portions when applied to said reel, whereby said band may be received around said flanges to one side of the center of said hub with said strap disposed between said flanges and engaging said tape to prevent unwinding and to retain the same on said reel.

References Cited in the file of this patent

UNITED STATES PATENTS

| | | |
|---|---|---|
| Re. 9,019 | Fleisher | Jan. 6, 1880 |
| 2,124,064 | Harris | July 19, 1938 |
| 2,174,049 | Werner | Sept. 26, 1939 |
| 2,768,740 | Cranwill | Oct. 30, 1956 |

FOREIGN PATENTS

| | | |
|---|---|---|
| 530,393 | Germany | Sept. 11, 1931 |